3,522,185
SOLID DETERGENT CONTAINING THE CRYSTALLINE FORM OF A BIS-TRIAZINYLAMINO STILBENE OPTICAL BRIGHTENER
Heinrich Hausermann, Riehen and Hans Schlapfer, Basel, Switzerland, and Christopher Johannes Tscharner, Warwick, R.I., assignors to Geigy Chemical Corporation, Ardsley, N.Y., a corporation of New York
Original application May 12, 1967, Ser. No. 638,065, now Patent No. 3,472,842. Divided and this application Feb. 28, 1969, Ser. No. 816,864
Claims priority, application Switzerland, May 13, 1966, 7,030/66
Int. Cl. C11d 1/02, 1/66, 9/00
U.S. Cl. 252—89   1 Claim

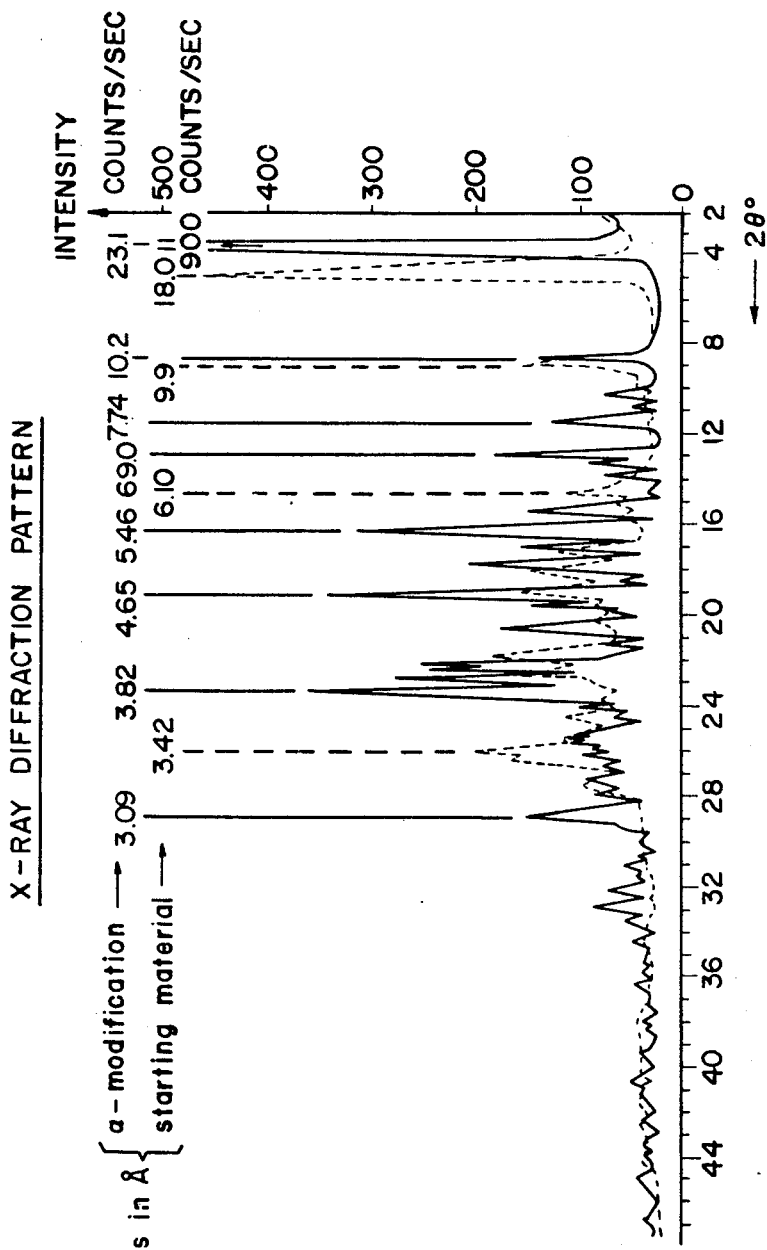
July 28, 1970  H. HAUSERMANN ET AL  3,522,185
SOLID DETERGENT CONTAINING THE CRYSTALLINE FORM OF
A BIS-TRIAZINYLAMINO STILBENE OPTICAL BRIGHTENER
Original Filed May 12, 1967
INVENTORS
Heinrich Hausermann
Hans Schlapfer
Christopher Johannes
Tscharner

United States Patent Office 3,522,185
Patented July 28, 1970

ABSTRACT OF THE DISCLOSURE

For incorporation in solid detergents, the thermostable α-crystal form of the optical brightener, the disodium salt of 4,4' - bis - [2" - phenylamino - 4" - (N - methyl- β - hydroxy - ethylamino) - s - triazinyl - (6") - amino]-stilbene - 2,2' - disulfonic acid having an X-ray diffraction diagram as shown in the accompanying drawing, is produced by converting thermally instable forms of the above-named optical brightener to thermostable sodium salts by heating the thermally instable forms with a water-soluble, colorless sodium salt electrolyte in certain critical amounts at a temperature of from about 100° to 200° C.

---

This application is a divisional application of application Ser. No. 638,065 filed May 12, 1967 now U.S. Pat. No. 3,472,842.

BACKGROUND OF THE INVENTION

Field of the invention

This invention relates to a thermostable 4,4' - bis - triazinyl stilbene optical brightener and to a process for making the same. More particularly this invention pertains to a thermostable α-crystal form of a 4,4' - bis-(phenylamino - s - triazinylamino) - stilbene, to a novel process for making this crystal form, and to detergents, soaps and the like compositions containing said novel crystal form.

Description of prior art

The use of N,N' - bis - triazinyl derivatives of 4,4' - diaminostilbene - 2,2' - disulfonic acid for the brightening of cellulose and polyamide substrates has been known for a considerable time and has been greatly extended for the optical brightening of textile material. This optical brightening is performed today not only by the textile producer or finisher but, to an increasing extent, also by the housewife who washes her laundry with washing agents which contain optical brighteners. In order to increase the brightening effect, the suitable optical brighteners are incorporated into the washing agents during their production. The goal of producing washing agents which impart to laundry (wash load) a whiter and whiter aspect has made it necessary for the producers of such washing agent to constantly increase the amounts of brightener in their products. However, the relatively high contents of 2 to 5 kg. of brightener per ton of washing agent, which has lately been used by many producers, causes often a distinct discoloration of the washing powder. This undesirable discoloration often increases when these powders are stored in a damp atmosphere. The freedom from discoloration of the washing powder itself during the several stages of manufacture is used by the producers as a check that the production steps proceed as desired. This manufacturing control is made difficult or impossible if the admixture of optical brightener leads to discoloration of the entire product during its manufacture.

In Swiss Pat. No. 321,109, optical brighteners are described which, because of good affinity to cellulose fibers in a wide temperature range, are particularly suitable for use in washing liquors. An excellent, typical representative of this group is the disodium salt of 4,4' - bis - [2"-phenylamino - 4" - (N - methyl - β - hydroxyethylamino)-s - triazinyl - (6") - amino] - stilbene - 2,2' - disulfonic acid. This group of valuable optical brighteners for washing agents, when used in a high concentration, exhibits the disadvantageous discoloration of the washing powder mentioned above to a particularly marked degree. For instance, if these products are incorporated in amounts of 3 kg. and more, in the usual way, into 1000 kg. of washing powder, then these washing agents have an undesirable yellowish to yellow color which becomes even deeper on storing when exposed to humidity in the air.

It is known from the French Pat. No. 1,361,065 that the dialkali salts of 4,4' - bis - [2",4" - diphenylamino-s - triazinyl - (6") - amino] - stilbene - 2,2' - disulfonic acid, which can also be used as optical brighteners in washing agents, can be converted into a more stable crystal form by heating under pressure in the presence of alkaline substances. It would be obvious, therefore, to apply this process to the optical brighteners mentioned according to Swiss Pat. No. 321,109 in order to attain in this way a more stable modification which no longer discolors washing agents. Rearrangement tests with such optical brighteners, particularly with the disodium salt of 4,4' - bis - [2" - phenylamino - 4" - (N - methyl - β - hydroxyethylamino) - s - triazinyl - (6") - amino] - stilbene - 2,2' - disulfonic acid, made under conditions completely analogous to those given in the French patent, however, yielded more or less strongly yellow colored products which did not produce the desired improvements on incorporation into the usual commercial heavy washing agents. In addition, the French Pat. No. 1,361,065 teaches that the preferred conversion temperature lies above 145° and that inorganic salts prevent the formation of the new crystal form and thus are to be removed before the operation.

DETAILED DISCLOSURE

In view of the above, it has surprisingly been found that a crystal form which is thermostable in the above-described uses is obtained when an instable form such as is obtained under normal production conditions, of Formula I

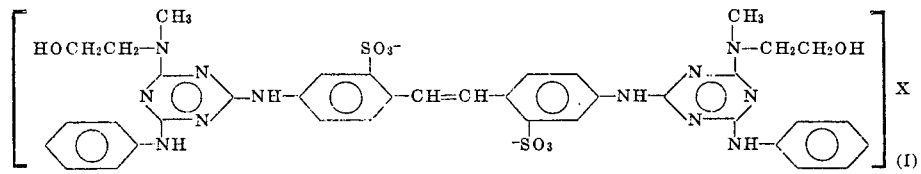

wherein X represents two monovalent cations or one divalent cation, in an aqueous electrolyte solution of sodium salts of inorganic or organic acids, the concentration of said sodium salts in said electrolyte solution being of sufficient amount to prevent the dissolution of the salt of Formula I, is heated in a batch or continuous operation to temperatures between about 100° C. and about 200° C., optionally in the presence of alkaline substances, and, on completion of the conversion, the stable disodium salt, which is characterized by a definite crystal lattice, of Formula II

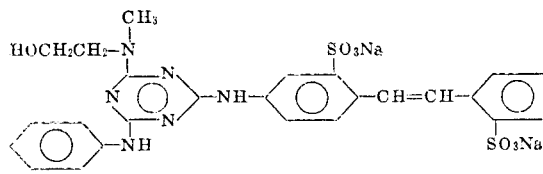 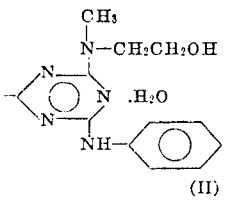

(II)

is isolated. The thermostable crystal form so obtained is termed the α-form or α-modification hereinbelow. In this process, the conversion proceeds very well even at relatively low temperatures of less than 140° C.; the process is substantially independent of the salt content of the starting material. Preferably the pH of the reaction mixture is 7 or higher.

The above-mentioned instable forms of a salt of the anionic optical brightener of Formula I are forms which are (1) either crystals which are not thermostable or (2) are insufficiently crystalline to begin with; i.e. the crystallites or grains of such forms do not show any distinct, but at best diffuse, diffraction lines in their X-ray diffraction patterns, which latter can be obtained by the well-known powder technique using a Geiger counter or Proportional counter or the like instrument to record the intensity of the diffracted rays.

The X-ray patterns shown in the accompanying figure were obtained by us by the well-known powder technique described, for instance, by Klug and Alexander in "X-Ray Diffraction Procedures for Polycrystalline and Amorphous Materials," published by John Wiley and Sons, New York, N.Y. (1954) especially p. 235 et seq., using a Proportional counter-equipped goniometer made by N. V. Philips Gloeilampen-Fabrieken, Eindhoven, Netherlands.

Here and in the following, the new α-crystal form of the stilbene derivative according to the invention as defined above is termed thermostable because it is thermostable up to at least 150° C., and, during and after incorporation into a moist washing agent containing sodium ions it is not converted into a yellow-colored form. We have found that of a dozen different crystal forms of the disodium salt of 4,4'-bis-[2''-phenylamino-4''-(N-methyl-β-hydroxyethylamino) - s - triazinyl-(6'')-amino]-stilbene-2,2'-disulfonic acid prepared by us, only the above α-form possesses this thermostability.

The crystalline α-form of the compound of Formula II has the form of needles, prisms or platelets and is characterized by an X-ray diffraction diagram having the following characteristic lines: a very strong line at 23.1 A., three strong lines at 5.46 A., 4.65 A. and 3.82 A., as well as four fairly strong lines at 10.2 A., 7.74 A., 6.90 A. and 3.09 A., as shown in the accompanying diagram.

The compound of Formula I used as starting material can be produced by known methods such as those described in Swiss Pat. No. 321,109. For example, first one mol of 4,4'-diaminostilbene-2,2'-disulfonic acid and 2 mols of cyanuric chloride are reacted at −10° to +10° C., the intermediate product formed is then reacted at 0–30° C. with 2 mols of aniline, and finally, the remaining two chlorine atoms in the 4,4'-bis-[2''-phenylamino-4''-chloro-s-triazinyl-(6'')-amino]-stilbene - 2,2' - disulfonic acid so formed are exchanged for N-methyl-ethanolamine radicals by heating the reaction mixture at 50–90° C. with excess amine. The reaction product is then generally isolated as a dialkali salt, preferably the disodium salt. Produced under the usual conditions, depending on the method of isolation such as salting out with different salts or bases such as NaCl, $Na_2CO_3$, NaOH, $NH_4Cl$, precipitation with an acid and conversion of the inner salt obtained into another salt by treatment with a base, and also depending on the degree of drying, these products have different crystal structures which, however, are not thermostable, i.e. on heating to a higher temperature, e.g. to above 80–100° C., they lose built-in water or solvent molecules and change into a more or less strongly yellow colored powder the texture of which as determined in the Philips Proportional counter goniometer may even have partly X-ray amorphous character.

Preferably the sodium or the inorganic or an organic ammonium cation is used as cation in Formula I. Such ammonium cation is preferably of the formula

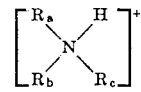

wherein each of $R_a$, $R_b$ and $R_c$ is hydrogen, lower alkyl, hydroxy-lower alkyl, or two of these R's taken together form a polymethylene chain of from 4 to 6 —$CH_2$-members one of which may be replaced by an oxygen atom. When "cation" therein represents a divalent cation such as magnesium or calcium, use of a sequestering agent in the mixture is mandatory.

The electrolytes used in the process of the invention must be water-soluble, colorless, and their anion must be heat-stable up to 200° C. in the reaction mixture and under the reaction conditions described above.

Mainly the halides such as chloride, bromide or iodide, and the salts of lower aliphatic, especially saturated unsubstituted or hydroxyl-substituted hydrocarbon carboxylic acids, but preferably lower fatty acids such as lower alkanoates, e.g. the formiate and acetate are used as sodium salts of inorganic and organic acids, with the help of which the conversion into the crystal modification is performed.

Preferably, these electrolytes are used as at least 2.5 N solutions; the upper concentration limit is their saturation. The concentration of sodium salt dissolved in the electrolyte in the reaction mixture should be sufficient to prevent the salt of Formula I from dissolving in the mixture, and should preferably be so great that there are at least 2 gram-ions of sodium to 1 mol of stilbene compound to be converted, i.e. that the conversion takes place at a pH which is at least about 7. In any event, the solubility rate of the electrolyte in the reaction mixture must be high enough so that sufficient amount thereof dissolves in the mixture to prevent the compound of Formula I from dissolving therein. So that the reaction mixture can still be stirred well, it is advantageous to use at least 2 parts by volume of electrolyte solution to 1 part of stilbene compound.

The preferred reaction temperature lies between 115 and 135° C., and the reaction time can vary from a few minutes up to several hours.

The stilbene compound used as starting compound can optionally be used in the form of the free sulfonic acid or of its inner salt with the addition of bases in an amount sufficient for the desired salt formation.

In converting the compound of Formula I into the thermostable modification by means of the electrolyte solutions mentioned, advantageously an alkaline substance is added to the mixture. This addition of base is mainly indicated when an ammonium salt is used as starting material and it is necessary when the free acid is used so that the reaction takes place in a medium the pH of which is preferably at least about 7. At higher pH, the reaction time depends on the temperature applied and may range from 30 minutes to 24 hours, but should be interrupted as soon as the conversion of the brightener to the thermostable modification is complete as can be readily determined by control samples, and before any substantial saponification thereof has taken place. In addition, the base added protects the apparatus from corrosion. Also, other substances such as chelating agents or organic, hydrophilic solvents such as alcohols having 1–4 C atoms, lower alkyl ethers of glycols, or lower ketones can be added.

Alkaline additives can be both inorganic as well as organic compounds, e.g. alkali hydroxides such as NaOH or KOH; alkali cyanides such as sodium or potassium cyanide; alkali carbonates such as sodium or potassium carbonate; alkali phosphates; ammonia; organic bases such as mono-, di- and tri-ethanolamine, mono-, di- and tri-isopropanolamine, methylamine, diethylamine, tripropylamine, N-methyldiethanolamine, pyrrolidine, piperidine and morpholine, as well as their N-alkyl derivatives.

Examples of chelating agents are the alkali metal salts of nitrilotriacetic acid and of ethylenediamine N,N,N',N'-tetra-acetic acid.

Advantageously stainless steel apparatus constructed for an excess pressure of 1–6 atm. is used for the conversions. If the reaction mixture is brought to the desired reaction temperature in a relatively short time of 5–30 minutes, then melts are formed which later solidify in crystalline form and yield a coarse crystalline material having a high bulk density. These products have extremely low water solubility and have the most favorable behavior with regard to discoloration of washing powders. If the suspensions of optical brighteners to be converted are slowly heated, i.e. for 3–6 hours, then a relatively fine, white suspension is formed. These products also are not thixotropic and can easily be filtered off and washed.

The conversion product isolated, e.g. by filtration, is advantageously washed, e.g. with a 5–15% solution of sodium chloride or the sodium salt used for the reaction. The main purpose of washing with sodium chloride or with another electrolyte containing sodium ions is to reduce the amount of electrolyte in the filter cake. Care should be taken, however, not to partially dissolve out the stilbene compound as this would again cause a yellow discoloration of the product because stilbene derivative dissolved in the washing liquor separates into a yellow modification on drying.

The new α-crystal modification of the compounds of Formula II is distinguished by good stability to heat. Thus, for example, the α-modification obtained according to the present process of the disodium salt of 4,4'-bis-[2''-phenylamino - 4'' - (N - methyl - β - hydroxyethylamino) - s - triazinyl - (6'') - amino] - stilbene - 2,2' - disulfonic acid containing 1 mol of crystal water, which is particularly effective as a cellulose brightener, is stable up to towards 200° C. The new crystal form can best be characterized by an X-ray diagram. The method for taking this, described in the following Example 1, is suitable.

There are mainly two reasons why it could not have been foreseen that the process according to the invention would lead to a stable crystal modification. From the state of the art as mentioned, it was to have been expected that inorganic salts such as sodium chloride would prevent the production of a stable crystal form. The present invention has shown, however, that in this case, electrolytes are actually necessary for the crystal conversion. The French Pat. No. 1,361,065 also teaches that the conversion is advantageously performed at temperatures of over 145° C. It was, therefore, to have been expected that the production of stable crystals of products of Formula I would also be facilitated at temperatures of over 145° C. That the conversion can well be made at substantially lower temperatures is surprising. Working at lower temperatures means that no costly pressure apparatus is necessary as, at the reaction temperatures of 115–135° C. which are suitable in practice, the excess pressure always remains below 2 atm.

Solid detergents, including soaps and the like compositions to which the thermostable optical brightener according to the invention can be added at any step of their production are, more particularly, anionic detergents such as alkali metal salts of alkyl-aryl-sulfonates, especially alkyl-benzene and alkyl-naphthalene sulfonates, alkali metal salts of sulfates of higher fatty alcohol, or alkali metal salts of higher fatty acids, in which the cation portion consists preponderantly of sodium ions.

The following examples illustrate the invention without limiting it in any way. Where not otherwise stated, parts are given as parts by weight and the temperatures are in degrees centigrade.

EXAMPLE 1

40 g. of the disodium salt of 4,4'-bis-[2''-phenylamino-4''-(N-methyl-β-hydroxyethylamino) - s - triazinyl - (6'') - amino]-stilbene-2,2'-disulphonic acid, produced according to Example 1 of Swiss Pat. No. 321,109, are stirred into a homogeneous slurry in 200 ml. of 20% aqueous sodium chloride solution. 5 g. of sodium carbonate are added and the whole is poured into a 300 ml. stainless steel rotation autoclave. The pressure vessel, while continuously rotating, is slowly heated over a free gas flame until the inner temperature, measured with a central thermometer tube, has risen to 125°. The heating time is 4 hours. The mixture is then kept for 4 hours at 125–130°. The yellow modification of the stilbene compound used is changed into the practically colourless suspension of the new α-crystal modification. After cooling, the product is filtered off, washed with 10% sodium chloride solution and dried in vacuo at 80°. In this way, a white powder is obtained which fluoresces blue in UV light.

If 4 g. of the brightener obtained in this way are mixed with an aqueous slurry of 1000 g. of a commercial heavy washing agent and then dried, a clearly brightened washing powder is obtained whilst a washing combination produced in an analogous way with the previously known brightener modification has a yellowish tinge.

To characterise the new crystal modification, an X-ray diagramme was taken both of the starting material and the new α-crystal modification. This can be seen from the attached drawing and was obtained by the method described below.

The starting material and the new crystal modification differ from each other by the interplanar spacings ("d-values").

To determine these interplanar spacings, X-ray diffraction patterns were produced by the technique mentioned further above with the Philips Proportional counter goniometer. The instrument actually records the intensity of the diffracted ray on the vertical axis versus the angle of diffraction on the horizontal axis with $CuK_\alpha$ radiation, and then this angle is converted to interplanar spacings expressed in angstrom units. The values given are accurate to within 2 percent and in most cases, particularly with d-values of less than 10 A., variation is less than 1%. Therefore, this variance should be taken into account when interpreting the specification and the appended claims.

The starting material is characterized by a very strong line at $d=18.0$ A. and three fairly strong lines at 9.9 A, 6.10 A. and 3.42 A. In addition there are a few weaker lines.

In contrast, the new α-crystal modification is characterized by a very strong line at $d=23.1$ A., three strong lines at 5.46 A., 4.65 A. and 3.82 A. as well as four fairly strong lines at 10.2 A., 7.74 A, 6.90 A. and 3.09 A. The weaker lines and lines common to both crystal modifications have been left out.

EXAMPLE 2

In a 3500 ml. stainless steel autoclave fitted with a stirrer, 130 g. of disodium salt of 4,4'-bis-[2''-phenylamino-4''-(N-methyl-β-hydroxyethylamino) - s - triazinyl-(6'')-amino]-stilbene-2,2'-disulphonic acid, produced according to Example 1 of Swiss Pat. No. 321,109, are suspended in 1500 ml. of 20% aqueous sodium chloride solution. 4 g. of triethanolamine are added and the whole is heated to 120° within 4 hours. The mixture is then stirred for 6 hours at 120–125°. After cooling, the white suspension is filtered under suction, the residue is washed with 10% sodium chloride solution and the compound is dried at 80° in vacuo. The white product containing sodium chloride obtained according to the process has the same crystal structure as the product obtained according to Example 1.

A sample thereof washed with water is dried for 14 hours under high vacuum at 135° and analyzed. The analysis showed: $C_{38}H_{38}N_{12}O_8S_2 \cdot 1H_2O$. Calculated (percent): 49.7 C; 4.4 H; 18.3 N; 7.0 S. Found (percent): 49.7 C; 4.5 H; 18.1 N; 6.8 S.

The 1 mol of crystal water is so strongly bound that also drying at 160° does not yield a product containing less water. This behaviour shows the stable incorporation of the water molecule into the crystal lattice.

EXAMPLE 3

17 g. of the stilbene compound used as starting material in Example 1 in 200 ml. of 25% sodium chloride solution are heated in an autoclave for 6 hours at 130–137°. A pale grey hard mass is obtained which is crushed, washed with 2.5% sodium chloride solution and dried at 80° in vacuo. The product obtained forms a pale beige powder and, as is shown by the X-ray diagram, consists mainly of the α-modification characterized in Example 1.

EXAMPLE 4

160 g. of the disodium salt of 4,4'-bis-[2''-phenylamino-4''-(N-methyl-β-hydroxyethylamino) - s - triazinyl - (6'')-amino]-stilbene-2,2'-disulphonic acid produced according to Example 1 of Swiss Pat. No. 321,109, are slurried in 1500 ml. of 25% sodium chloride solution. After adding 5 g. of triethanolamine, 5 g. of sodium carbonate and 5 g. of the sodium salt of ethylenediamine-N,N,N',N'-tetraacetic acid, the whole is heated for 10 hours while stirring in a stainless steel autoclave fitted with a stirrer at 130–134°. After cooling, the crystal product formed is filtered off, washed with 10% sodium chloride solution and dried in vacuo at 80°. A white crystal powder containing sodium chloride is obtained, the crystal structure of which corresponds to the product of the process according to Example 1.

EXAMPLE 5

22 g. of bis-diethanolamine salt of 4,4'-bis-[2''-phenylamino - 4'' - (N-methyl-β-hydroxyethylamino)-s-triazinyl-(6'')-amino]-stilbene-2,2'-disulphonic acid, 135 ml. of water, 90 g. of crystallised sodium acetate, 0.8 g. of sodium salt of ethylenediamine-N,N,N',N'-tetra-acetic acid and 5 g. of sodium carbonate are heated in a rotation autoclave to 130° within 40 minutes and then for 4 hours at 125–130°. After cooling, the almost colourless crystal mass is separated from the mother liquor, crushed in a mortar, washed with water and dried in vacuo at 80°. The product obtained contains 1 mol of crystal water and possesses the α-modification. Analysis showed: $C_{38}H_{38}N_{12}O_8S_2Na_2 \cdot H_2O$. Calculated (percent): 49.7 C; 4.4 H; 18.3 N; 7.0 S. Found (percent): 49.6 C; 4.6 H; 18.0 N; 6.7 S.

The following salts are converted into the desired α-modification of the disodium salt in an analogous way: di-ammonium salt, di-monoethanolamine salt, di-potassium salt, di-triethanolamine salt, di-methylamine salt, bis-di-isopropanolamine salt, bis-dimethylamine salt, di-morpholine salt, di-triethylamine salt, di-N-methylmorpholine salt, di-pyrrolidine salt, di-piperidine salt, di-N-methyl-ethanolamine salt and di-N-methyl-diethanolamine salt. The salts used as starting materials can be produced as follows:

250 g. of the disodium salt are dissolved at 90° in 3000 ml. of water and, at 90–95°, 40 g. of acetic acid are added within 15 minutes while stirring. A thick slurry is obtained which, to facilitate filtration, is stirred for 1 hour at 95–90°. The mixture is then cooled within 1 hour to 45°, the yellow precipitate is filtered off under suction and washed with 500 ml. of water. To convert into the corresponding salts, the inner salt of the disulphonic acid obtained in this way is stirred in water and the pH is adjusted at 80–90° to 8.5 with excess base. The salt is then isolated by evaporation in vacuo or crystallisation.

Further examples for the production of the stable α-modification of the optical brightener of the formula

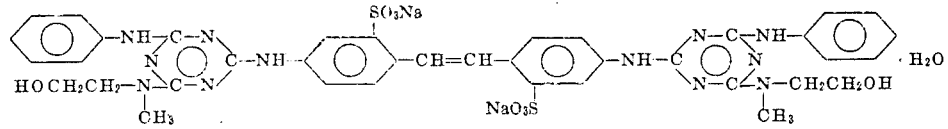

are summarised in the following table. In Examples 6–38 and 44–50, 100 g. of the disodium salt and in Examples 39–43, 100 g. of the bis-diethanolamine salt are used as starting material. Otherwise the procedure is similar to that of Example 1.

| Example No. | Electrolyte | Alkaline substance | Additives | Temperature, ° | Reaction time in hours |
|---|---|---|---|---|---|
| 6 | 1250 ml. NaCl 10% | 3 g. triethanolamine | | 120–125 | 14 |
| 7 | 670 ml. NaCl 15% | 1.7 g. triethanolamine | | 115–120 | 8 |
| 8 | 1250 ml. NaCl 15% | 2 g. triethanolamine | | 120–125 | 6 |
| 9 | 1250 ml. NaCl 15% | 4 g. triethanolamine | | 115–160 | 1 |
| 10 | 1250 ml. NaCl 20% | | | 140–145 | 4 |
| 11 | 1250 ml. NaCl 20% | 3 g. triethanolamine | | 155–160 | 1 |
| 12 | 1250 ml. NaCl 25% | 6 g. triethanolamine | | 115–120 | 6 |
| 13 | 1250 ml. NaCl 25% | 3 g. triethanolamine | | 120–125 | 6 |
| 14 | 500 ml. NaCl 25% | 12.5 g. Na₂CO₃ | | 140–148 / 125–130 | ½ / 3½ |
| 15 | 1150 ml. NaOAc 24% | 35 g. Na₂CO₃ | 1.3 g. EDTA | 120–125 | 4 |
| 16 | 900 ml. NaOAc 24% | 10 g. Na₂CO₃ | 1.3 g. EDTA | 125–130 | 4 |
| 17 | 900 ml. NaOAc 24% | 10 g. Na₂CO₃ | 1.3 g. EDTA | 125–130 | 8 |
| 18 | 1,000 ml. NaOAc 24% | 50 g. triethanolamine | | 120–134 | 14 |
| 19 | 1,000 ml. NaOAc 24% | 10 g. diethanolamine | | 130–135 | 4 |
| 20 | 1,000 ml. NaOAc 24% | 10 g. isopropanolamine | | 130–135 | 4 |
| 21 | 1,000 ml. NaOAc 24% | 10 g. morpholine | | 130–135 | 4 |
| 22 | 1,000 ml. NaOAc 24% | 5 g. monoethanolamine | | 125–130 | 4 |
| 23 | 1,000 ml. NaOAc 24% | 10 g. trisodium phosphate | | 125–130 | 5 |

| Example No. | Electrolyte | Alkaline substance | Additives | Temperature, ° | Reaction time in hours |
|---|---|---|---|---|---|
| 24 | 500 ml. NaOAc 24% | 12.5 g. Na₂CO₃ | | 150-160 | 1 |
| 25 | 1,000 ml. NaOAc 28% | 25 g. Na₂CO₃ | 3 g. EDTA | ¹ 106 | 18 |
| 26 | 1,000 ml. NaOAc 30% | 20 ml. conc. ammonia | | 120-125 | 4 |
| 27 | 1,000 ml. NaOAc 30% | 10 g. Na₂CO₃ | 3 g. EDTA | 125-130 | 9 |
| 28 | 440 ml. NaOAc 30% | 10 g. Na₂CO₃ | | 125-130 | 8 |
| 29 | 350 ml. NaOAc 30% | 10 g. Na₂CO₃ | 10 g. C₂H₅OCH₂CH₂OH | 125-130 | 8 |
| 30 | 270 ml. NaOAc 30% | 5 g. Na₂CO₃ | | 125-130 | 8 |
| 31 | 440 ml. NaOAc 30% | 10 g. Na₂CO₃ | 1.2 g. EDTA | 140-145 | 4 |
| 32 | 1,060 ml. NaCl 16.6% | 5 g. NaCN | | 120-125 | 6 |
| 33 | 1,130 ml. HCOONa 23% | 10 g. Na₂CO₃ | | 120-125 | 6 |
| 34 | 1,130 ml. HCOONa 23% | 10 g. Na₂CO₃ | | 140-145 | 3 |
| 35 | 1,130 ml. NaBr 22% | 10 g. Na₂CO₃ | | 140-145 | 3 |
| 36 | 1,070 ml. NaCl 16.6% | 5 g. NaCN | | ¹ 100 | 6 |
| 37 | 1,080 ml. HCOONa 16.6% | 10 g. Na₂CO₃ | | 140-145 | 3 |
| 38 | 1,180 ml. NaI 25.6% | 10 g. Na₂CO₃ | | 140-145 | 3 |
| 39 | 1,130 ml. NaOAc 24% | 34 g. Na₂CO₃ | 1.3 g. EDTA | 110-115 | 4 |
| 40 | 1,130 ml. NaOAc 24% | 34 g. Na₂CO₃ | 1.3 g. EDTA | 115-120 | 4 |
| 41 | 1,130 ml. NaOAc 24% | 34 g. Na₂CO₃ | 1.3 g. EDTA | 120-125 | 4 |
| 42 | 1,130 ml. NaOAc 24% | 34 g. Na₂CO₃ | 1.3 g. EDTA | 125-130 | 4 |
| 43 | 800 ml. NaOAc 30% | 11 g. Na₂CO₃ | | 130-135 | 6 |
| 44 | 750 ml. NaCl 25%; 500 ml. Na₂SO₄ 20% | 6 g. triethanolamine | | 115-120 | 6 |
| 45 | 750 ml. NaCl 25%; 500 ml. Na₂SO₄ 20% | 6 g. triethanolamine | | 100-105 | 24 |
| 46 | 500 ml. NaCl 20%; 750 ml. NaOAc 22% | | | 135-140 | 2½ |
| 47 | 100 ml. Na₃PO₄ 10%; 1,000 ml. NaCl 25% | | | 120-125 | 4 |
| 48 | 250 ml. Na₂SO₄ 20%; 300 ml. NaOAc 24%; 450 ml. NaCl 20% | 5g. Na₂CO₃ | | 125-130 | 5 |
| 49 | 600 g. NaNO₃; 1,000 ml. water | 6 g. triethanolamine | | 100 | 34 |
| 50 | 2,700 g. NaClO₃; 5,000 ml. water | 50 g. Na₂CO₃ | | 95-100 | 30 |

¹ Reflux.

In the above examples, "EDTA" means the tetrasodium salt of ethylenediamine-N,N,N',N'-tetra-acetic acid and "Ac" means the acetyl radical.

EXAMPLE 51

40 g. of disodium salt of 4,4'-bis-[2"-phenylamino-4" - (N - methyl - β-hydroxyethylamino)-s-triazinyl-(6")-amino]-stilbene-2,2'-disulphonic acid produced according to Example 1 of Swiss Pat. No. 321,109, are suspended in 400 ml. of a 2.5 N solution of the sodium salt of glycolic acid and, after the addition of 4 g. of sodium carbonate, the whole is heated for 6 hours at 130–135°. After cooling, the almost white suspension obtained is filtered, the residue is washed with 15% sodium chloride solution and dried in vacuo at 80°. The crystal product obtained has the same stable crystal structure as the product obtained by the process of Example 1.

If in the above example, the 400 ml. of 2.5 N solution of sodium salt of glycolic acid are replaced by 400 ml. of 2.5 N solution of sodium salt of diglycolic acid, then the desired α-modification is also obtained.

EXAMPLE 52

30 g. of the dipotassium salt of 4,4'-bis-[2"-phenylamino - 4" - (N-methyl-β-hydroxyethylamino)-s-triazinyl-(6")-amino]-stilbene-2,2'-disulphonic acid are stirred into a homogeneous slurry in 400 ml. of 15% aqueous sodium chloride solution and, after adding 3 g. of sodium carbonate, the whole is heated for 8 hours at 125–130° while rotating. After cooling, the white crystal slurry is filtered off, the residue is washed with 10% sodium chloride solution and dried at 80° in vacuo. In this way the disodium salt of the optical brightener used in the α-modification characterized in Example 1 is obtained.

The dipotassium salt used as starting material is produced as follows: 28.6 g. of the disodium salt are converted into the free acid by the method given in Example 5, this is dissolved in 500 ml. of water, with the addition of 7 g. of potassium hydroxide, at 90–100°, the solution is clarified while hot and the yellowish filtrate is allowed to cool. The dipotassium salt crystallizes out in the form of fine yellow crystals.

EXAMPLE 53

0.35 g. of the optical brightener obtained according to Example 1 are stirred into 3.5 ml. of 1 N sodium hydroxide solution and then worked up into a homogeneous paste with 100 ml. of water and 100 g. of a heavy duty detergent consisting of:

| | Parts |
|---|---|
| Sodium dodecylbenzene sulphonate | 15.2 |
| Sodium lauryl sulphate | 3.8 |
| Sodium tripolyphosphate | 25.6 |
| Tetrasodium pyrophosphate | 7.6 |
| Sodium silicate | 4.8 |
| Magnesium silicate | 1.9 |
| Sodium carbonate | 5.0 |
| Carboxymethyl cellulose | 1.4 |
| Sodium salt of ethylenediamine tetra-acetic acid | 0.3 |
| Sodium sulphate | 34.4 |

The mixture is then dried at 85°, crushed and finally pressed through a sieve.

The washing powder obtained has a substantially more white appearance in daylight than a comparative sample which has been brightened with the instable crystal modification of the same optical brightener.

The following detergent compositions were prepared in a similar manner to that of Example 46:

EXAMPLE 54

100 pounds of cocoanut oil are melted in a jacketed pan and, after settling, passed through a fine linen cloth or hair-sieve to remove any impurities. The oil is then run into the stirring kettle and when cooled to 95° F., 54 pounds of caustic soda lye of 38° Bé. are run into it in a thin stream with constant stirring until the oil is completely saponified and, while the mass commences to thicken, 4 oz. (about 112 g.) of the thermostable optical brightener obtained according to Example 1, stirred into 1 liter of cold water are added gradually during the stirring. The mass is then cooled by stirring and finally brought into the frames, in which it is allowed to slowly congeal.

A fine white, optically brightened soap is thus obtained.

EXAMPLE 55

A heavy duty detergent of similar advantageous properties as that of Example 53 is prepared in the manner described in that example, as follows:

5 liters of 1 N-sodium hydroxide solution into which 500 g. of the thermostable optical brightener of Example 1 have been stirred are worked up into a homogeneous part with 100 liters of water and 100 kg. of a batch consisting of

| | Parts |
|---|---|
| Sodium dodecyl-benzene sulfonate | 20 |
| Sodium tripolyphosphate | 50 |
| Sodium metasilicate | 5 |
| Sodium sulfate | 15 |
| Carboxymethyl-cellulose | 0.8 |
| Water | 9 |

Drying, crushing and sieving of the mixture follows as described in Example 53.

EXAMPLE 56

A batch consisting of

| | Parts |
|---|---|
| Sodium n-dodecylbenzyl sulfonate (45% active) | 51 |
| Sodium xylene sulfonate (40% active) | 24 |
| Nonylphenoxy polyoxyethylene ethanol | 10 |
| Lauroyl diethanolamide | 7 |
| Water | 8 | was mixed with 100 parts of water and 2 parts of a normal sodium hydroxide solution containing 0.2 part of the thermostable optical brightener of Example 1, dispersed therein.

The mixture was further treated as described in Example 53 and an excellent detergent for use in household washing machines was obtained.

EXAMPLE 57

A batch consisting of

| | Parts |
|---|---|
| Nonylphenol polyethylene glycol ether (mole ratio of nonylphenol to ethylene oxide about 1:7 to 1:15) | 25 |
| Sodium tripolyphosphate, hydrated | 25 |
| Disodium phosphate | 5 |
| Sodium sesquicarbonate | 25 |
| Sodium chloride | 25 | are intimately mixed for six minutes on a ribbon mixer with 0.5 part of the thermostable optical brightener of Example 1.

A hand dishwashing powder of stable white aspect is obtained.

EXAMPLE 58

If, in Example 53, the 100 g. of washing agent are replaced by a heavy duty detergent consisting of

| | Parts |
|---|---|
| Sodium lauryl sulfate | 7.8 |
| Sodium dodecylbenzene sulfonate | 11.0 |
| Sodium tripolyphosphate | 11.0 |
| Tetrasodium pyrophosphate | 16.6 |
| Sodium silicate | 4.6 |
| Carboxymethyl cellulose | 1.4 |
| Sodium sulfate | 36.8 |
| Sodium perborate ($NaBO_3 \cdot 4H_2O$) | 8.0 | and otherwise the procedure given in Example 53 is followed, then a washing agent having a high degree of whiteness is also obtained.

We claim:

1. A solid detergent selected from the group consisting of anionic and nonionic detergents and from 0.1 to 1% by weight of the thermostable crystal form of the optical brightener of the formula

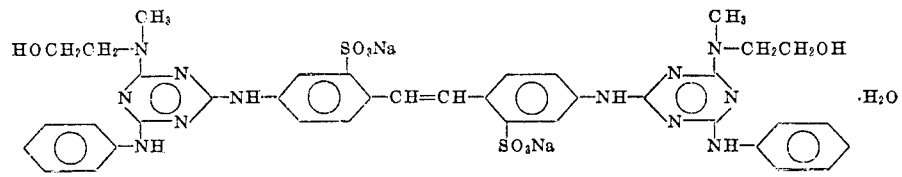

characterized by an X-ray diffraction pattern having the following characteristic lines corresponding to: a very strong line at 23.1 A., three strong lines at 5.46 A., 4.65 A. and 3.82 A. and four fairly strong lines at 10.2 A., 7.74 A., 6.90 A. and 3.09 A.

References Cited

UNITED STATES PATENTS 2,762,801  9/1966  Hausermann.

FOREIGN PATENTS 1,361,065  6/1963  France.

MAYER WEINBLATT, Primary Examiner

W. E. SCHULZ, Assistant Examiner

U.S. Cl. X.R.

252—107